United States Patent
Achi Vasudevan et al.

(10) Patent No.: US 10,680,913 B1
(45) Date of Patent: Jun. 9, 2020

(54) ERROR REMEDIATION IN SOFTWARE AS A SERVICE (SAAS) PORTALS

(71) Applicant: Hewlett Packard Enterprise Development LP, Houston, TX (US)

(72) Inventors: Pradeep Kumar Achi Achi Vasudevan, Karnataka (IN); Jyoti Ranjan, Karnataka (IN); Unmesh Gurjar, Karnataka (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/272,641

(22) Filed: Feb. 11, 2019

(51) Int. Cl.
*H04L 29/06* (2006.01)
*H04L 12/24* (2006.01)

(52) U.S. Cl.
CPC ...... *H04L 41/5025* (2013.01); *H04L 41/0866* (2013.01); *H04L 41/0893* (2013.01); *H04L 41/5074* (2013.01); *H04L 63/1425* (2013.01); *H04L 63/1433* (2013.01)

(58) Field of Classification Search
CPC ............. H04L 41/0866; H04L 41/0893; H04L 41/5025; H04L 41/5074; H04L 63/1425; H04L 63/1433; H04L 63/1408; H04L 67/025; G06F 11/362; G06F 21/54; G06F 3/048; G06F 8/20; G06F 8/65; G06F 9/546; G06N 5/022; H04W 48/02
See application file for complete search history.

(56) References Cited

U.S. PATENT DOCUMENTS

| | | | |
|---|---|---|---|
| 7,984,333 B2 | 7/2011 | Ruan et al. | |
| 9,692,789 B2 | 6/2017 | Kirti et al. | |
| 2006/0271341 A1* | 11/2006 | Brown | G06F 8/20 703/1 |
| 2007/0074169 A1* | 3/2007 | Chess | G06F 21/54 717/126 |
| 2009/0165021 A1* | 6/2009 | Pinkston | G06F 9/546 719/314 |

(Continued)

OTHER PUBLICATIONS

Fritz, A.; "Application Insights Proactive Detection"; Jan. 20, 2016; 5 pages.

(Continued)

*Primary Examiner* — Le H Luu
(74) *Attorney, Agent, or Firm* — Hewlett Packard Enterprise Patent Department

(57) ABSTRACT

Examples of error remediation in SaaS portals is disclosed. In an example, activity data in a SaaS portal is monitored, where the SaaS portal is from amongst a plurality of SaaS portals grouped in a portal group. The activity data includes a record of events associated with a service request processed by the SaaS portal, an alert notification on occurrence of an error in the SaaS portal, and user information relating to credentials provided by a user accessing the SaaS portal. A runtime error in the SaaS portal may be detected based on the monitored activity data. The runtime error is based on faults in a service or an Application Programming Interface (API) associated with the SaaS portal, a security vulnerability, and non-compliance with a configuration policy governing the SaaS portal. A remediation measure for the runtime error is determined and implemented in the portal group.

20 Claims, 5 Drawing Sheets

(56) References Cited

U.S. PATENT DOCUMENTS

| | | | |
|---|---|---|---|
| 2014/0215441 A1* | 7/2014 | Thukkaram | G06F 11/362 |
| | | | 717/125 |
| 2017/0039130 A1* | 2/2017 | Nandakumar | G06F 8/65 |
| 2017/0193521 A1 | 7/2017 | Backer et al. | |
| 2017/0214701 A1* | 7/2017 | Hasan | H04L 63/1408 |
| 2017/0236067 A1* | 8/2017 | Tjiong | G06F 3/048 |
| | | | 706/11 |
| 2018/0062942 A1* | 3/2018 | Walsh | H04L 67/025 |
| 2019/0102244 A1* | 4/2019 | Tarlano | G06N 5/022 |
| 2019/0261203 A1* | 8/2019 | Raleigh | H04W 48/02 |

OTHER PUBLICATIONS

Kamen, S.; "BMC Application Diagnostics Overview"; printed on Aug. 9, 2018 from webpage: https://docs.bmc.com/docs/display/public/appdiag25/BMC+Application+Diagnostics+overview; 3 pages.

Performance Vision; "Managing Application Performance in SaaS Environments"; printed on Aug. 9, 2018 from webpage: https://www.performancevision.com/product-services/how-it-works/saas-capture/; 3 pages.

ServiceNow; "Operational Intelligence"; printed Aug. 9, 2018 from webpage: https://www.servicenow.com/products/operational-intelligence.html; 7 pages.

\* cited by examiner

SYSTEM 100

PROCESSOR(S) 102

MEMORY 104

[[MONITOR ACTIVITY DATA IN A SOFTWARE AS A SERVICE (SAAS) PORTAL, THE SAAS PORTAL BEING FROM AMONGST A PLURALITY OF SAAS PORTALS GROUPED IN A PORTAL GROUP, WHEREIN THE ACTIVITY DATA INCLUDES A RECORD OF EVENTS ASSOCIATED WITH A SERVICE REQUEST PROCESSED BY THE SAAS PORTAL, AN ALERT NOTIFICATION ON OCCURRENCE OF AN ERROR IN THE SAAS PORTAL, AND USER INFORMATION RELATING TO CREDENTIALS PROVIDED BY AN USER ACCESSING THE SAAS PORTAL;

DETECT, BASED ON THE MONITORED ACTIVITY DATA, A RUNTIME ERROR IN THE SAAS PORTAL, THE RUNTIME ERROR BEING BASED ON AT LEAST ONE OF A FAULT IN A SERVICE ASSOCIATED WITH THE SAAS PORTAL, A FAULT IN AN APPLICATION PROGRAMMING INTERFACE (API) ASSOCIATED WITH THE SAAS PORTAL, A SECURITY VULNERABILITY ASSOCIATED WITH THE SAAS PORTAL, AND A DEVIATION FROM A CONFIGURATION POLICY GOVERNING THE SAAS PORTAL;

IDENTIFY AN ERROR TYPE OF THE RUNTIME ERROR, THE ERROR TYPE BEING INDICATIVE OF A CAUSE OF THE RUNTIME ERROR;

DETERMINE, BASED ON THE ERROR TYPE, A REMEDIATION MEASURE FOR THE RUNTIME ERROR TO RESTORE OPERABILITY OF THE SAAS PORTAL; AND

IMPLEMENT THE REMEDIATION MEASURE IN THE PORTAL GROUP]]

Fig. 1

ERROR REMEDIATION IN SOFTWARE AS A SERVICE (SAAS) PORTALS

BACKGROUND

Software as a service (SaaS) is a software distribution model in which a service provider or vendor hosts applications for its customers. The hosted applications can be accessed by the customers over the Internet. In SaaS models, applications are centrally hosted and managed by the service provider. The customers may obtain licences which define their access rights, privileges, and usage parameters while accessing the hosted applications.

SaaS based platforms may use a multi-instance architecture or a multitenant architecture. In the multi-instance architecture, multiple customers are served by a separate instance of an application and an operating system running on a separate virtual machine implemented on a common hardware infrastructure, such as a server. In the multitenant architecture, a single instance of an application runs on the server and serves multiple customers, and each customer has a separate database to enable data isolation between the customers.

BRIEF DESCRIPTION OF DRAWINGS

The following detailed description references the drawings, wherein:

FIG. 1 illustrates a system for remediation of a runtime error in a portal group, according to an example, according to an example;

DETAILED DESCRIPTION

Figure 2:
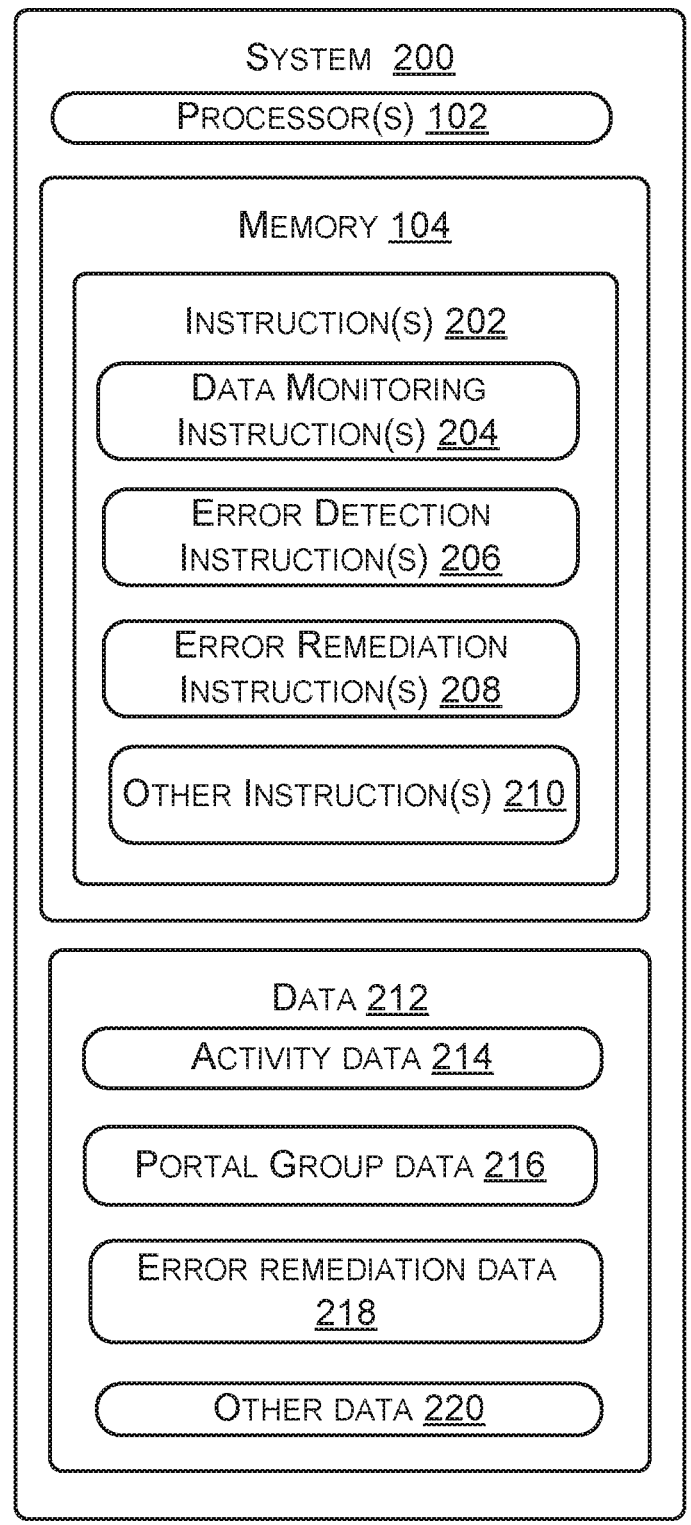
FIG. 2 illustrates a system for remediation of a runtime error in a portal group, according to another example.

A SaaS based platform may be implemented as a web portal which may be represented as a collection of related web pages, including multimedia content, identified by a uniform resource locator (URL), and published on a web server. The web portal may be accessed via an Internet Protocol (IP) network, such as the Internet, or a local area network (LAN), by referencing to the URL. The web portal through which the SaaS based platform is implemented is also referred to as a SaaS portal or portal. Applications hosted by the SaaS portal may be accessed by a user or customer through a web browser. Execution of a hosted application or multiple hosted applications provide services hosted by the SaaS portal.

SaaS portals are employed by different organizations to provide a varied range of services such as, email solutions, e-commerce platforms, internet banking, software tools, networking solutions, social media applications, and hybrid cloud management platforms. The hosted applications may interact with the Operating System (OS) and among themselves by using Application Program Interfaces (APIs). An API is a set of instructions defining methods of communication between components of an application, between different applications, or between applications and the Operating System.

Consider a scenario where an organization uses a portal A for implementing an e-commerce platform, a portal B for implementing a banking platform, and a portal C for implementing a cloud management platform. The portals A, B, and C may be provided and managed by a single service provider. Consider that when the portal A processes a specific user input, the portal A encounters an error due to a bug present in an application hosted by the portal A which gets executed when the specific user input is processed. The bug refers to a flaw or defect in a set of instructions of the application which results in execution of the application in an irregular or uncontrolled manner. In another example, an API in portal A may crash on executing a bug during execution of a specific chain of commands which may be initiated by the specific user input. In another example, a cloud service latency between a service request and a response from the portal A may be above permissible limits. The above situations may give rise to an error in portal A. The error refers to abnormal functioning of the SaaS portal or deviation from defined standard rules when the SaaS portal is executing a specific function. After occurrence of the error in the portal A, generally, personnel in a development support team are notified of the error. Once notified, the development support team identifies a cause of the error and develops a bug fix for the error or makes modifications in operational configuration of the SaaS portal to resolve the error. The bug fix is a change to a system or set of instructions executed by the system to resolve a programming glitch. A bug fix is also called a program temporary fix (PTF) or a patch. The portal A is then upgraded with the bug fix.

The portals B and C may encounter an error which is similar to the error encountered by the portal A. The portals A, B, and C may be provided by the same service provider and may provide similar functions. Thus, the bugs present in portal A may also be present in portals B and C, and portals B and C may be prone to similar errors as encountered by portal A. Generally, when a number of portals managed by the same service provider encounter an error similar to the error that previously occurred in one of the other portals, the errors are resolved sequentially as and when they occur in each portal. This may result in slow resolution of errors and increased effort and expense on the development support team. Also, this may involve repetition of steps in resolving the error for each of the portals, which may increase manual effort.

The present disclosure facilitates in proactively applying a resolution of an error across multiple SaaS portals to avoid occurrence of the error in the multiple SaaS portals. According to the present disclosure, activity data in a SaaS portal is monitored, where the SaaS portal is one from amongst a plurality of SaaS portals grouped in a portal group. The portal group is a predefined collection of SaaS portals. The activity data includes a record of events associated with a service request processed by the SaaS portal, an alert notification on occurrence of an error in the SaaS portal, and user information relating to credentials provided by a user accessing the SaaS portal. A service request is a request received from a user to access a specific service provided by the SaaS portal. An event is an identifiable occurrence that has significance for system hardware or software. An event represents a message, token, count, pattern, value, or marker that can be recognized within an ongoing stream of monitored inputs, specific error conditions or signals, thresholds crossed, counts accumulated, and so on. The service request may trigger execution of multiple applications hosted by the SaaS portal. Output data obtained after execution of one application may be provided as input data for execution of another hosted application. The events may include information on the output data, error reports, latency of response of the hosted applications, etc., stored in a log file of the SaaS portal. Credentials refer to information that may be used to access the SaaS portal, such as user identification information and passwords.

Based on the monitored activity data, a runtime error in the SaaS portal may be detected. The runtime error is based on at least one of a fault in a service associated with the SaaS portal, a fault in an Application Programming Interface (API) associated with the SaaS portal, a security vulnerability associated with the SaaS portal, and non-compliance with a configuration policy governing the SaaS portal. The security vulnerability refers to a flaw in a set of instructions of a system which exposes the system to potential exploitation through unauthorized access or attacks by malware, such as viruses, worms, and Trojan horses. The configuration policy corresponds to a predefined set of rules and a set of configuration parameters associated with at least one of resource utilization, access control, data backup, and disaster recovery in the SaaS portal. After detection of the runtime error, a remediation measure for the runtime error is determined to restore operability of the SaaS portal and the remediation measure is implemented in the multiple SaaS portals in the portal group. Operability is the ability to keep an equipment or a system in a safe functioning condition, as per predefined operational requirements. The remediation measure refers to a set of actions or operations to be implemented in the SaaS portal for resolution of the runtime error.

Thus, the present disclosure facilitates in prevention of occurrence of a runtime error in multiple SaaS portals grouped in a portal group, where the runtime error has already occurred and has been resolved in a portal in the portal group. This may reduce occurrence of runtime errors by proactive error resolution. This may also reduce the manual effort in error troubleshooting and expenses on the development support team.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a system 100 for remediation of a runtime error in a portal group, according to an example. The system 100 may be a computing system having data processing, storage, and networking capabilities. Examples of the system 100 include personal computers, enterprise servers, embedded systems, network controllers, or the like. In an example the system 100 may deploy one hybrid cloud management platform or more than one hybrid cloud management platforms for managing multiple cloud networks. The hybrid cloud management platforms may be implemented through SaaS portals. The SaaS portals may be grouped in one or more than one portal groups based on a user input. In an example, the user input is an input from the system administrator to select a SaaS portal to be grouped under a portal group. Thus, the portal group is a collection of SaaS portals as predefined by the system administrator.

The system 100 includes a processor 102 and a memory 104 coupled to the processor 102. The memory 104 stores instructions executable by the processor 102. The instructions when executed by the processor 102 may cause the processor 102 to monitor activity data in a SaaS portal, the SaaS portal being from amongst a plurality of SaaS portals grouped in a portal group. The activity data includes a record of events associated with a service request processed by the SaaS portal, an alert notification on occurrence of an error in the SaaS portal, and user information relating to credentials provided by a user accessing the SaaS portal.

In an example, monitoring the activity data includes capturing log reports of events and storing the log reports in a log file of the SaaS portal. The log file is a computer file that records events that occur in an operating system or on execution of other software, or on exchange of messages between different users and an application. The log file may include information in relation to different events occurring in the SaaS portal. The events may include information on the output data, error reports, latency of response of the hosted applications, etc.

The instructions when executed by the processor 102 may cause the processor 102 to detect, based on the monitored activity data, a runtime error in the SaaS portal. The runtime error may be based on at least one of a fault in a service associated with the SaaS portal, a fault in an Application Programming Interface (API) associated with the SaaS portal, a security vulnerability associated with the SaaS portal, and non-compliance with a configuration policy governing the SaaS portal.

In an example, when a specific user input is executed by an application of the SaaS portal, a bug in the application may cause a fault in the application thereby resulting in a failure of a service request. The fault in the application and the consequent failure of the service request may be identified as events in the log file of the application. By inspecting the log file, a runtime error based on the fault in the service associated with the SaaS portal may be detected. In another example, an API of the SaaS portal may receive an overwhelming number of service requests at a certain time period, such as, an e-commerce portal receiving service requests during a flash sale. This may cause the number of service requests to exceed the API rate limit which may clog the API resulting in failure of the service requests. The rate-limit specifies the number of service requests the API is configured to receive from a particular user and may be predefined as "number of requests per window per user access token". The clogging of the API may be identified as an event in the log file and on inspection of the log file, a runtime error based on the fault in the API associated with the SaaS portal may be detected.

In another example, a flaw or glitch in a set of instructions associated with an application of the SaaS portal may expose user credentials of a user, which is otherwise encrypted during normal operation. This may lead the system 100 exposed to potential exploitation through unauthorized access or malware, such as viruses, worms, Trojan horses. Exposure of the user credentials may be identified as a violation of set standards of compliance and governance policy of operation of the SaaS portal. On identification of the violation of the compliance and governance policy, a runtime error based on the security vulnerability associated with the SaaS portal may be detected. In another example, consider that the SaaS portal based on its configuration policy is to capture snapshots of application data once in twenty four hours and store the snapshots in a secondary memory. Due to a glitch in a set of instructions for capturing the snapshot, the SaaS portal may capture snapshots of the application data in every 10 seconds, thereby resulting in redundant snapshots, wasteful consumption of memory, and high processor usage thereby affecting performance and responsiveness of the SaaS portal. On monitoring the activity data relevant to capturing of the snapshots, it may be detected that the snapshots are captured at a rate different than the predefined rate in the configuration policy, thereby detecting a runtime error based on non-compliance with the configuration policy.

After the runtime error is detected, instructions when executed by the processor 102 may cause the processor 102 to identify an error type of the runtime error. The error type is indicative of a cause of the runtime error. The error type may be one of a security error, a functional error, and a performance error. When the runtime error occurs due to violation of a security policy of the SaaS portal, the runtime error may be identified as a security error. The security policy corresponds to a predefined set of rules to protect the SaaS portal from security threats. When the runtime error occurs due to failure of operation of one of a service associated with the SaaS portal and an API associated with the SaaS portal, the runtime error may be identified as a functional error. When the runtime error occurs due to non-compliance with the configuration policy of the SaaS portal, the runtime error may be identified as a performance error.

After the error type is identified, the instructions when executed by the processor 102 may cause the processor 102 to determine a remediation measure for the runtime error to restore operability of the SaaS portal. The remediation measure is determined based on the error type. Further, the instructions when executed by the processor 102 may cause the processor 102 to implement the remediation measure in the portal group. In an example, the remediation measure may be implemented in each of the SaaS portals in the portal group, thereby proactively preventing occurrence of the runtime error across the SaaS portals of the portal group.

FIG. 2 illustrates a system 200 for error remediation in a portal group, according to an example. In an example, the system 200 may be an enterprise server in a datacenter, a network controller, and an embedded device.

The system 200 includes the processor 102 and the memory 104 coupled to the processor 102. The memory 104 stores instructions executable by the processor 102. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104. The computer-readable instructions, also referred to as instructions, includes instruction(s) 202. The instructions(s) 202 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memory 104 may include any computer-readable medium known in the art including, for example, volatile memory (e.g., RAM), and/or non-volatile memory (e.g., EPROM, flash memory, etc.). The instruction(s) 202 include data monitoring instruction(s) 204 which corresponds to instructions stored on a computer-readable medium and executable by a processor to monitor the activity data in the system 100, error detection instruction(s) 206 to detect a runtime error in a SaaS portal based on the monitored activity data, and error remediation instructions 208 which identifies a remediation measure for the detected runtime error. The instruction(s) 202 also comprise other instruction(s) 210 that supplement applications on the system 200, for example, execution of functions of an operating system.

Data 212 serves, amongst other things, as a repository for storing data that may be fetched, processed, received, or generated during execution of the instruction(s) 202 by the processor 102. The data 212 comprises activity data 214 which stores data relating to a record of events associated with a service request processed by the SaaS portal, an alert notification on occurrence of an error in the SaaS portal, and user information relating to credentials provided by a user accessing the SaaS portal, portal group data 216 which stores identification information relating to the SaaS portals grouped under the portal group, and error remediation data 218 which includes remediation measures for the detected runtime errors. The data 212 also comprises other data 220 that may be fetched, processed, received, or generated during execution of other instruction(s) 210.

Consider that a plurality of SaaS portals are grouped under a portal group. In an example, a system administrator may select the SaaS portals to be grouped under the portal group. The portal group thus forms a predefined collection of SaaS portals. In an example, a plurality of hybrid cloud management platforms may be grouped under a portal group.

The data monitoring instructions 204, when executed by the processor 102, cause the processor 102 to monitor activity data of each of the SaaS portals in the portal group. The activity data includes a record of events associated with a service request processed by the SaaS portal, an alert notification on occurrence of an error in the SaaS portal, and user information relating to credentials provided by a user accessing the SaaS portal. The activity data may be monitored by analyzing log files maintained by different services and applications of the SaaS portals and by analyzing alert notifications or error messages in each of the SaaS portals. In an example, the activity data for a predefined time period is captured and a pattern in the activity data may be identified for purposes of monitoring. In an example, predictive analysis of the activity data may be performed for extracting information from existing data sets in order to determine patterns and predict future outcomes and trends.

The error detection instructions 206 when executed by the processor 102, may cause the processor to detect a runtime error in the SaaS portal, based on the monitored activity data. The runtime error is a malfunction in the SaaS portal that occurs during operation of the SaaS portal. In an example, information pattern in the activity data may be compared with a predefined information pattern to detect that the runtime error has occurred.

For example, consider that after a specific service request, a set of applications are executed at the SaaS portal to provide the requested service. Each of the set of applications maintain a log which records events corresponding to the respective application. When an application, from the set of applications, encounters a bug/glitch, the application may fail or may become non-responsive which may trigger a record of such event to be recorded in the log file of the respective application. The log file being a part of the activity data is monitored by the processor 102 through execution of the data monitoring instructions 204. Using information of the monitored log file, the error detection instructions 206 may enable the processor 102 to identify that there is a bug in an application from the set of applications. The runtime error may be based on at least one of a fault in a service associated with the SaaS portal, a fault in an API associated with the SaaS portal, a security vulnerability associated with the SaaS portal, and non-compliance with a configuration policy governing the SaaS portal.

After the runtime error is detected, the error remediation instructions 208 may enable the processor 102 to determine a remediation measure for the runtime error to restore operability of the SaaS portal. In an example, the remediation measure is determined based on an error type identified for the runtime error. The error type is indicative of a cause of the runtime error. Further, the error remediation instructions 208, when executed by the processor 102, may cause the processor 102 to implement the remediation measure in the portal group.

In an example, the runtime error may be identified as a functionality error, when the runtime error occurs due to failure of operation of one of the service associated with the SaaS portal and the API associated with the SaaS portal. In an example, the operation of the service may fail when a bug is present in one of the applications executed to provide the service. In an example. the operation of the API may fail due to presence of a bug in an API that may cause the API to receive service requests higher than its specified API limit. In an example, the runtime error may be identified as a security error, when the runtime error occurs due to violation of a security policy of the SaaS portal. The security policy corresponds to a predefined set of rules to protect the SaaS portal from security threats.

When the error type of the runtime error is identified as one of a functional error and a security error, the error remediation instructions 208 may cause the processor 102 to generate a bug ticket. The bug ticket is a notification requesting a bug fix for the functionality error or the security error depending on the identified error type. A bug fix is a change to a system or set of instructions to resolve a programming glitch. A bug fix is also called a program temporary fix (PTF) or a patch. The bug ticket notifies the development support team about the bug. The development support team may develop the bug fix and upload the same in the system 200. The system 200 may receive the bug fix and may store the bug fix in the error remediation data 218. After receiving the bug fix, a notification may be generated by the system 200. The error remediation instructions 208 when executed by the processor 102, may cause the processor 102 to implement the bug fix for the security error and the bug fix for the functionality error in each of the SaaS portals in the portal group. Implementation of the bug fix in a SaaS portal refers to modifications in the set of instructions where the bug had been identified, to resolve the runtime error.

In an example, when the runtime error occurs due to non-compliance with the configuration policy of the SaaS portal, the runtime error may be identified as a performance error. The configuration policy corresponds to a predefined set of rules and a set of configuration parameters associated with at least one of resource utilization, access control, data backup, and disaster recovery in the SaaS portal.

When the error type of the runtime error is detected as the performance error, the error remediation instructions 208 when executed by the processor 102 may cause the processor 102 to check whether the configuration policy of the SaaS portal is identical to respective configuration policies of each of the plurality of SaaS portals in the portal group. When the configuration policy of the SaaS portal which has encountered the runtime error, is identified to be identical to respective configuration policies of each of the plurality of SaaS portals in the portal group, the error remediation instructions 208 may enable generation of a resolution request. The resolution request is a notification requesting a change in the set of configuration parameters of the SaaS portal to resolve the performance error.

In an example, when the resolution request is generated, the error remediation instructions 208 may enable readjustment of the set of configuration parameters based on the configuration policy of the SaaS portal. The error remediation instructions 208 further enable generation of a notification on readjustment of the set of configuration parameters for the SaaS portal which encountered the runtime error. Further, the error remediation instructions 208, when executed by the processor 102 may cause the processor 102 to readjust respective configuration parameters for each of the plurality of SaaS portals in the portal group, based on the configuration policy. Examples of the configuration parameters include processor usage parameters, memory usage parameters, API rate limits, security parameters, etc. Readjustment of the configuration parameters may refer to recalibration of the configuration parameters as per the configuration policy.

When at least one of the plurality of SaaS portals in the portal group has a configuration policy different from the configuration policy of the SaaS portal that has encountered the runtime error, the error remediation instructions 208 may enable generation of an investigation ticket. The investigation ticket is a notification requesting inspection of the performance error to identify a cause of the performance error.

In an example, the development support team may investigate the cause of the performance error based on logs and metrics. When after investigation, the development support team finds that the performance error is of such a nature that it likely to occur in the SaaS portals of the portal group, the development support team may provide user inputs to convert the investigation ticket to a bug ticket. The bug ticket may be then analyzed by the development support team for a bug fix. The error remediation instructions 208 may further enable implementation of the bug fix in each of the SaaS portals of the portal group. When after investigation, the development support team finds that the performance error is of such a nature that it is unlikely to occur in the SaaS portals of the portal group, the development support team may provide user inputs to discard the investigation ticket.

Figure 3:
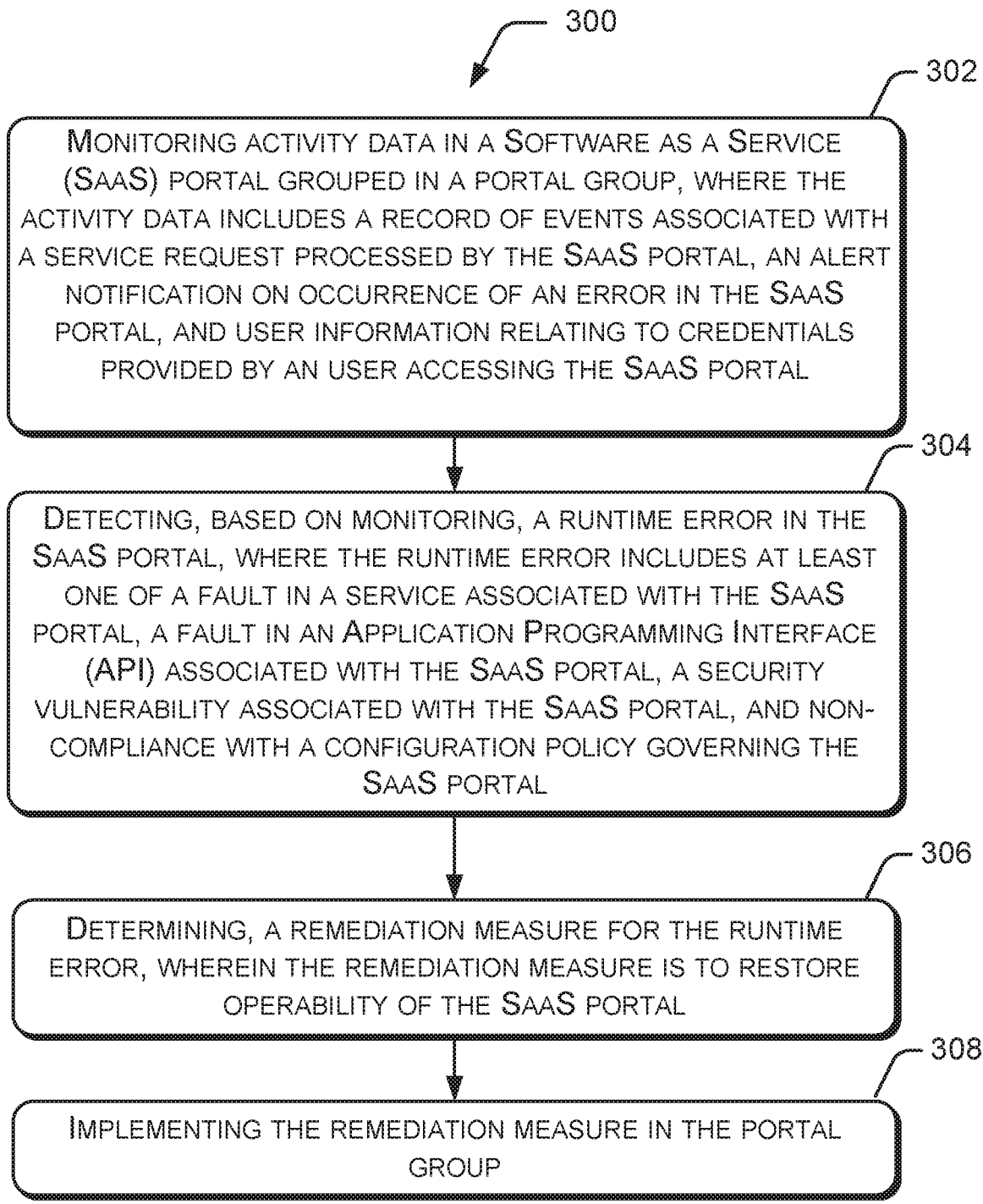
FIG. 3 illustrates a method for remediation of a runtime error in a portal group, according to an example.

FIG. 3 illustrates a method 300 for remediation of a runtime error in a portal group, according to an example. The method 300 may be executed by a system, such as the system 100 or 200. The method 300 can be implemented by processing resource(s) or computing device(s) through any suitable hardware, a non-transitory machine readable medium, or combination thereof. In an example, step(s) of the method 300 may be performed by execution of computer-readable instructions, such as the data monitoring instructions 204, error detection instructions 206, and error remediation instructions 208, which includes instructions stored on a medium and executable by a processing resource, such as the processor 102, of a system, such as the system 100 or 200. Further, although the method 300 is described in context of the aforementioned system 100 or 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, activity data in a Software as a Service (SaaS) portal is monitored. The SaaS portal being from amongst a plurality of SaaS portals grouped in a portal group. The activity data includes a record of events associated with a service request processed by the SaaS portal, an alert notification on occurrence of an error in the SaaS portal, and user information relating to credentials provided by a user accessing the SaaS portal.

At block 304, a runtime error in the SaaS portal is detected based on the monitored activity data. The runtime error is based on at least one of a fault in a service associated with the SaaS portal, a fault in an Application Programming Interface (API) associated with the SaaS portal, a security vulnerability associated with the SaaS portal, and non-compliance with a configuration policy governing the SaaS portal. in an example, the monitoring of the activity data and detection of the runtime error may be performed based on predictive analysis of service logs, alert notifications, and user information.

At block 306, a remediation measure for the runtime error is determined to restore operability of the SaaS portal. Operability is the ability to keep an equipment or a system in a safe functioning condition, as per predefined operational requirements. The remediation measure refers to a set of actions or operations to be implemented in the SaaS portal for resolution of the runtime error.

At block 308, the remediation measure is implemented in the portal group. in an example, the remediation measure is implemented in each of the plurality of SaaS portals in the portal group. Proactive implementation of the remediation measure before actual occurrence of a runtime error in a SaaS portal facilitates in reducing occurrence of errors in the portal group.

Figure 4:
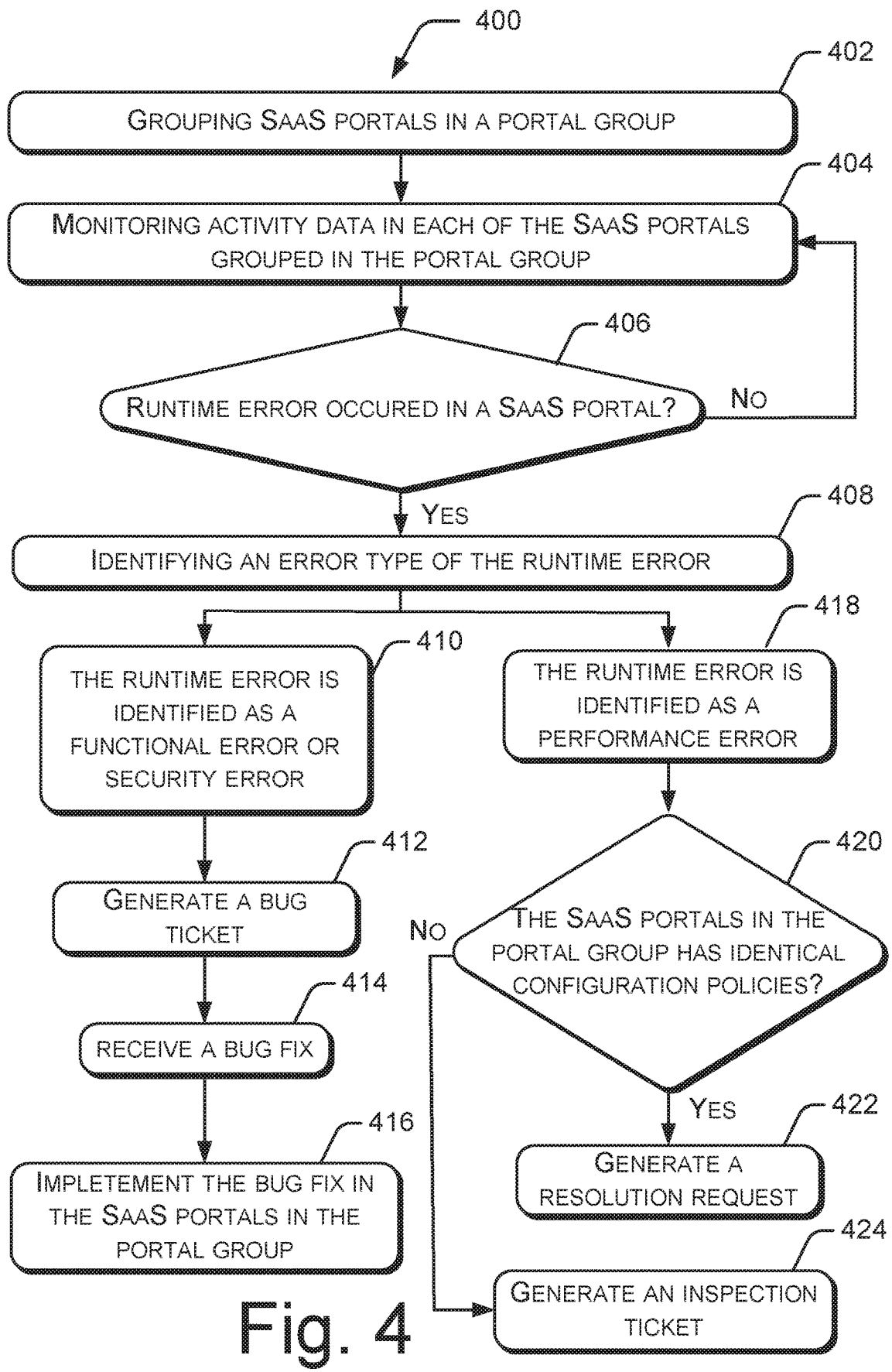
FIG. 4 illustrates a method for remediation of a runtime error in a portal group, according to another example.

FIG. 4 illustrates a method 400 for remediation of a runtime error in a portal group, according to an example. The method 400 may be executed by a system, such as the system 100 or 200. The method 400 can be implemented by processing resource(s) or computing device(s) through any suitable hardware, a non-transitory machine readable medium, or combination thereof. In an example, the method 400 may be performed by computer-readable instructions, such as the data monitoring instructions 204, the error detection instructions 206, and the error remediation instructions 208, which include instructions stored on a medium and executable by a processing resource, such as the processor 102, of a system, such as the system 100 or 200. Further, although the method 400 is described in context of the aforementioned system 100 or 200, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4, at block 402, a plurality of SaaS portals are grouped in a portal group. The plurality of SaaS portal may be identified based on selection made by an administrator. Activity data of each of the SaaS portals in the group is monitored at block 404. The activity data may be in the form of service logs, alert notifications, error messages, etc.

Based on the monitored activity data, at block 406, it may be detected whether a runtime error has occurred or not in any of the SaaS portals in the portal group. The runtime error is based on at least one of a fault in a service associated with the SaaS portal, a fault in an Application Programming Interface (API) associated with the SaaS portal, a security vulnerability associated with the SaaS portal, and non-compliance with a configuration policy governing the SaaS portal. The runtime error may be detected based on predictive analysis performed on the monitored activity data.

If the runtime error is detected in a SaaS portal in the portal group, ('Yes' branch from block 406), an error type of the runtime error is identified at block 408. The error type is indicative of a cause of the runtime error. If no runtime error is detected in the portal group, ('No' branch from block 406), the activity data is continuously monitored, at block 408.

The runtime error may be identified to be of one of the following error types, viz., a functional error, a security error, and a performance error. At block 410, the runtime error may be identified as a functionality error, when the runtime error occurs due to failure of operation of one of the service associated with the SaaS portal and the API associated with the SaaS portal. At block 410, the runtime error may be identified as a security error, when the runtime error occurs due to violation of a security policy of the SaaS portal. The security policy corresponds to a predefined set of rules to protect the SaaS portal from security threats.

After the runtime error is identified as one of a functional error and a security error, at block 412, a bug ticket is generated. The bug ticket is a notification requesting a bug fix for the security error or the functional error, as the case may be. The bug ticket is processed by a development support team which may upload a bug fix against the bug ticket. At block 414, the bug fix is received by the system, such as the system 100 or 200. The bug fix may be a PTF. At block 416, the bug fix for the security error or the functional error is implemented in each of the plurality of SaaS portals in the portal group.

At block 418, the runtime error may be identified as a performance error, when the runtime error occurs due to non-compliance with the configuration policy of the SaaS portal. The configuration policy corresponds to a predefined set of rules and a set of configuration parameters associated with at least one of resource utilization, access control, data backup, and disaster recovery in the SaaS portal. At block 420, it is checked whether the configuration policy of the SaaS portal is identical to respective configuration policies of each of the plurality of SaaS portals in the portal group. If the configuration policies of the SaaS portals in the portal group are identical, ('Yes' branch from block 420), a resolution request is generated at block 422. The resolution request is a notification requesting a change in the set of configuration parameters of the SaaS portal which encountered the performance error.

In an example, when the resolution request is generated, the set of configuration parameters may be readjusted based on the configuration policy of the SaaS portal. After readjustment of the set of configuration parameters, a notification indicative of completion of the readjustment of the set of configuration parameters is generated. After the notification is generated, respective configuration parameters for each of the plurality of SaaS portals in the portal group may be readjusted based on the configuration policy. Examples of the set of configuration parameters include processor usage parameters, memory usage parameters, API rate limits, security parameters, etc. Readjustment of the configuration parameters may refer to recalibration of the configuration parameters as per the configuration policy.

When at least one of the plurality of SaaS portals in the portal group has a configuration policy different from the configuration policy of the SaaS portal which encountered the performance error, an investigation ticket is generated at block 424. The investigation ticket is a notification requesting inspection of the performance error to identify a cause of the performance error.

Figure 5:
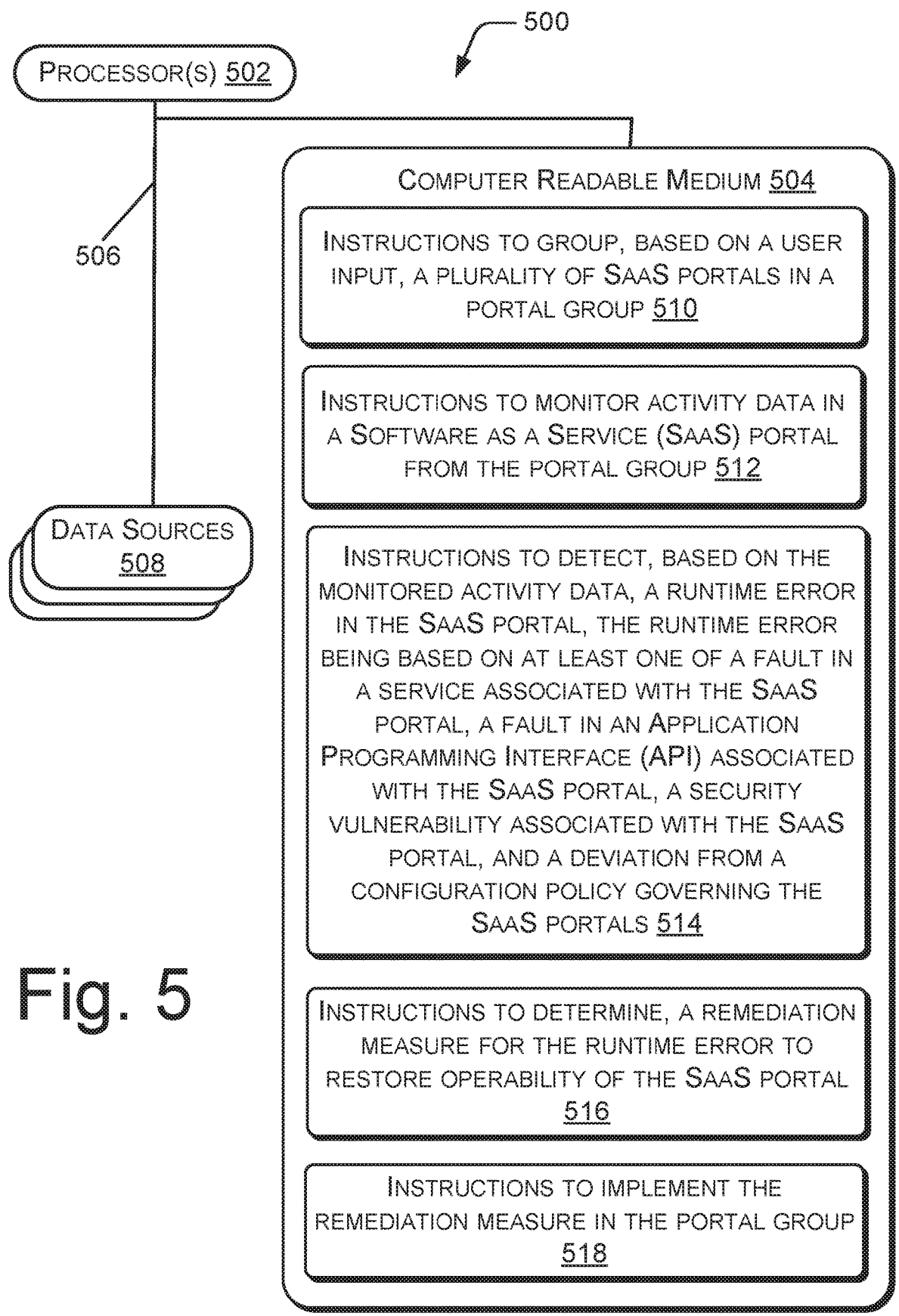
FIG. 5 illustrates a system environment implementing a non-transitory computer-readable medium for remediation of a runtime error in a portal group, according to an example.

FIG. 5 illustrates a system environment 500 implementing a non-transitory computer-readable medium for remediation of a runtime error in a portal group, according to an example. In an example, the system environment 500 includes processor(s) 502 communicatively coupled to a non-transitory computer-readable medium 504 through a communication link 506. In an example, the system environment 500 may be a system, such as the system 100 or 200. In an example, the processor(s) 502 may have one or more processing resources for fetching and executing computer-readable instructions from the non-transitory computer-readable medium 504.

The non-transitory computer-readable medium 504 can be, for example, an internal memory device or an external memory device. In an example implementation, the communication link 506 may be a direct communication link, such as any memory read/write interface.

The processor(s) 502 and the non-transitory computer-readable medium 504 may also be communicatively coupled to data sources 508 over a network, such as the Internet. The data sources 508 can include, for example, memory of the system, such as the system 100 or 200.

In an example implementation, the non-transitory computer-readable medium 504 includes a set of computer-readable instructions which can be accessed by the processor(s) 502 through the communication link 506 and subsequently executed to perform acts for remediation of a runtime error in a portal group.

Referring to FIG. 5, in an example, the non-transitory computer-readable medium 504 includes instructions 510 that cause the processor(s) 502 to group, based on a user input, a plurality of SaaS portals in a portal group. The user input may be provided by a system administrator.

Further, the non-transitory computer-readable medium 504 includes instructions 512 that cause the processor(s) 502 to monitor activity data in a SaaS portal from the portal group. The activity data includes a record of events associated with a service request processed by the SaaS portal, an alert notification on occurrence of an error in the SaaS portal, and user information relating to credentials provided by a user accessing the SaaS portal.

The non-transitory computer-readable medium 504 includes instructions 514 that cause the processor(s) 502 to detect, based on the monitored activity data, a runtime error in the SaaS portal. The runtime error is based on at least one of a fault in a service associated with the SaaS portal, a fault in an Application Programming Interface (API) associated with the SaaS portal, a security vulnerability associated with the SaaS portal, and a deviation from a configuration policy governing the SaaS portal. The configuration policy corresponds to a predefined set of rules and a set of configuration parameters associated with at least one of resource utilization, access control, data backup, and disaster recovery in the SaaS portal.

Further, the non-transitory computer-readable medium 504 includes instructions 516 that cause the processor(s) 502 to determine, a remediation measure for the runtime error to restore operability of the SaaS portal. The remediation measure being based on an error type of the runtime error, the error type being indicative of a cause of the runtime error.

In an example, the runtime error may be identified as a security error, when the runtime error occurs due to violation of a security policy of the SaaS portal. The security policy corresponds to a predefined set of rules to protect the SaaS portal from security threats. In an example, the runtime error may be identified as a functional error, when the runtime error occurs due to failure of operation of one of the service associated with the SaaS portal and the API associated with the SaaS portal. In an example, the runtime error may be identified as a performance error, when the runtime error occurs due to non-compliance with the configuration policy of the SaaS portal.

In an example, the non-transitory computer-readable medium 504 includes instructions that cause the processor(s) 502 to generate a bug ticket, when the runtime error is identified as one of the security error and the functional error. The bug ticket being a notification requesting a bug fix for the runtime error. Further, the non-transitory computer-readable medium 504 includes instructions that cause the processor(s) 502 to generate a notification on receiving the bug fix. Further, the non-transitory computer-readable medium 504 includes instructions 518 that cause the processor(s) 502 to implement the remediation measure in the portal group. Thus, the bug fix may be implemented in each of the plurality of SaaS portals in the portal group.

In an example, the non-transitory computer-readable medium 504 includes instructions that cause the processor(s) 502 to check whether the configuration policy of the SaaS portal is identical to respective configuration policies of each of the plurality of SaaS portals in the portal group, when the runtime error is identified as the performance error. Further, the non-transitory computer-readable medium 504 includes instructions that cause the processor(s) 502 to generate a resolution request, when the configuration policy of the SaaS portal is identified to be identical to respective configuration policies of each of the plurality of SaaS portals in the portal group. The resolution request is a notification requesting a change in the set of configuration parameters of the SaaS portal to resolve the performance error.

In an example, the non-transitory computer-readable medium 504 includes instructions that cause the processor(s) 502 to readjust the set of configuration parameters based on the configuration policy of the SaaS portal, when the resolution request is generated. A notification is generated on readjustment of the set of configuration parameters. Further, the non-transitory computer-readable medium 504 includes instructions that cause the processor(s) 502 to readjust respective configuration parameters for each of the plurality of SaaS portals in the portal group, based on the configuration policy.

Further, the non-transitory computer-readable medium 504 includes instructions that cause the processor(s) 502 to generate an investigation ticket, when at least one of the plurality of SaaS portals in the portal group has a configuration policy different from the configuration policy of the SaaS portal that has encountered the performance error. The investigation ticket is a notification requesting inspection of the performance error to identify a cause of the performance error.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method comprising:
   monitoring activity data in a Software as a Service (SaaS) portal, the SaaS portal being from amongst a plurality of SaaS portals grouped in a portal group, wherein the activity data includes a record of events associated with a service request processed by the SaaS portal, an alert notification on occurrence of an error in the SaaS portal, and user information relating to credentials provided by a user accessing the SaaS portal;
   detecting, based on monitoring, a runtime error in the SaaS portal, the runtime error being based on at least one of a fault in a service associated with the SaaS portal, a fault in an Application Programming Interface (API) associated with the SaaS portal, a security vulnerability associated with the SaaS portal, and non-compliance with a configuration policy governing the SaaS portal;
   determining a remediation measure for the runtime error to restore operability of the SaaS portal; and
   implementing the remediation measure in the portal group.

2. The method as claimed in claim 1, wherein determining the remediation measure comprises:
   identifying the runtime error as a functionality error, when the runtime error occurs due to failure of operation of one of the service associated with the SaaS portal and the API associated with the SaaS portal; and
   generating a bug ticket, the bug ticket being a notification requesting a bug fix for the functionality error.

3. The method as claimed in claim 2, wherein implementing the remediation measure in the portal group comprises:
   implementing the bug fix for the functionality error in each of the plurality of SaaS portals in the portal group.

4. The method as claimed in claim 1, wherein determining the remediation measure comprises:
   identifying the runtime error as a security error, when the runtime error occurs due to violation of a security policy of the SaaS portal, wherein the security policy corresponds to a predefined set of rules to protect the SaaS portal from security threats; and
   generating a bug ticket, the bug ticket being a notification requesting a bug fix for the security error.

5. The method as claimed in claim 4, wherein implementing the remediation measure in the portal group comprises:
   implementing the bug fix for the security error in each of the plurality of SaaS portals in the portal group.

6. The method as claimed in claim 1, wherein determining the remediation measure comprises:
   identifying the runtime error as a performance error, when the runtime error occurs due to non-compliance with the configuration policy of the SaaS portal, wherein the configuration policy corresponds to a predefined set of rules and a set of configuration parameters associated with at least one of resource utilization, access control, data backup, and disaster recovery in the SaaS portal;
   checking whether the configuration policy of the SaaS portal is identical to respective configuration policies of each of the plurality of SaaS portals in the portal group;
   generating a resolution request, the resolution request being a notification requesting a change in the set of configuration parameters of the SaaS portal to resolve the performance error, when the configuration policy of the SaaS portal is identified to be identical to respective configuration policies of each of the plurality of SaaS portals in the portal group; and
   generating an investigation ticket, the investigation ticket being a notification requesting inspection of the performance error to identify a cause of the performance error, when at least one of the plurality of SaaS portals in the portal group has a configuration policy different from the configuration policy of the SaaS portal.

7. The method as claimed in claim 6, wherein implementing the remediation measure in the portal group comprises:
   readjusting the set of configuration parameters based on the configuration policy of the SaaS portal, when the resolution request is generated;
   generating a notification after readjustment of the set of configuration parameters; and
   readjusting respective configuration parameters for each of the plurality of SaaS portals in the portal group, based on the configuration policy.

8. A system comprising:
   a processor; and
   a memory coupled to the processor, the memory storing instructions executable by the processor to:
   monitor activity data in a Software as a Service (SaaS) portal, the SaaS portal being from amongst a plurality of SaaS portals grouped in a portal group, wherein the activity data includes a record of events associated with a service request processed by the SaaS portal, an alert notification on occurrence of an error in the SaaS portal, and user information relating to credentials provided by a user accessing the SaaS portal;
   detect, based on the monitored activity data, a runtime error in the SaaS portal, the runtime error being based on at least one of a fault in a service associated with the SaaS portal, a fault in an Application Programming Interface (API) associated with the SaaS portal, a security vulnerability associated with the SaaS portal, and non-compliance with a configuration policy governing the SaaS portal;
   identify an error type of the runtime error, the error type being indicative of a cause of the runtime error;
   determine, based on the error type, a remediation measure for the runtime error to restore operability of the SaaS portal; and
   implement the remediation measure in the portal group.

9. The system as claimed in claim 8, wherein the processor is further to:
   identify the runtime error as a security error, when the runtime error occurs due to violation of a security policy of the SaaS portal, wherein the security policy corresponds to a predefined set of rules to protect the SaaS portal from security threats;
   identify the runtime error as a functional error, when the runtime error occurs due to failure of operation of one of the service associated with the SaaS portal and the API associated with the SaaS portal; and identify the runtime error as a performance error, when the runtime error occurs due to non-compliance with the configuration policy of the SaaS portal, wherein the configuration policy corresponds to a predefined set of rules and a set of configuration parameters associated with at least one of resource utilization, access control, data backup, and disaster recovery in the SaaS portal.

10. The system as claimed in claim 9, wherein the processor is further to:

generate a bug ticket, the bug ticket being a notification requesting a bug fix for the runtime error, when the runtime error is identified as one of the security error and the functional error; and generate a notification on receiving the bug fix.

11. The system as claimed in claim 10, wherein the processor is further to:

implement the bug fix in each of the plurality of SaaS portals in the portal group.

12. The system as claimed in claim 9, wherein the processor is further to:

check whether the configuration policy of the SaaS portal is identical to respective configuration policies of each of the plurality of SaaS portals in the portal group, when the runtime error is identified as the performance error;

generate a resolution request, the resolution request being a notification requesting a change in the set of configuration parameters of the SaaS portal to resolve the performance error, when the configuration policy of the SaaS portal is identified to be identical to respective configuration policies of each of the plurality of SaaS portals in the portal group; and generate an investigation ticket, the investigation ticket being a notification requesting inspection of the performance error to identify a cause of the performance error, when at least one of the plurality of SaaS portals in the portal group has a configuration policy different from the configuration policy of the SaaS portal.

13. The system as claimed in claim 12, wherein the processor is further to:

readjust the set of configuration parameters based on the configuration policy of the SaaS portal, when the resolution request is generated;

generate a notification on readjustment of the set of configuration parameters; and readjust respective configuration parameters for each of the plurality of SaaS portals in the portal group, based on the configuration policy.

14. The system as claimed in claim 12, wherein each of the plurality of SaaS portals in the portal group implements a hybrid cloud management platform.

15. A non-transitory computer-readable medium comprising computer-readable instructions, the computer-readable instructions when executed by a processor, cause the processor to:

group, based on a user input, a plurality of SaaS portals in a portal group;

monitor activity data in a Software as a Service (SaaS) portal from the portal group, wherein the activity data includes a record of events associated with a service request processed by the SaaS portal, an alert notification on occurrence of an error in the SaaS portal, and user information relating to credentials provided by a user accessing the SaaS portal;

detect, based on the monitored activity data, a runtime error in the SaaS portal, the runtime error being based on at least one of a fault in a service associated with the SaaS portal, a fault in an Application Programming Interface (API) associated with the SaaS portal, a security vulnerability associated with the SaaS portal, and a deviation from a configuration policy governing the SaaS portal;

determine, a remediation measure for the runtime error to restore operability of the SaaS portal, the remediation measure being based on an error type of the runtime error, the error type being indicative of a cause of the runtime error; and implement the remediation measure in the portal group.

16. The non-transitory computer-readable medium as claimed in claim 15, wherein the computer-readable instructions, when executed by the processor, further cause the processor to:

identify the runtime error as a security error, when the runtime error occurs due to violation of a security policy of the SaaS portal, wherein the security policy corresponds to a predefined set of rules to protect the SaaS portal from security threats;

identify the runtime error as a functional error, when the runtime error occurs due to failure of operation of one of the service associated with the SaaS portal and the API associated with the SaaS portal; and identify the runtime error as a performance error, when the runtime error occurs due to non-compliance with the configuration policy of the SaaS portal, wherein the configuration policy corresponds to a predefined set of rules and a set of configuration parameters associated with at least one of resource utilization, access control, data backup, and disaster recovery in the SaaS portal.

17. The non-transitory computer-readable medium as claimed in claim 16, wherein the computer-readable instructions, when executed by the processor, further cause the processor to:

generate a bug ticket, the bug ticket being a notification requesting a bug fix for the runtime error, when the runtime error is identified as one of the security error and the functional error; and generate a notification on receiving the bug fix.

18. The non-transitory computer-readable medium as claimed in claim 17, wherein the computer-readable instructions, when executed by the processor, further cause the processor to:

implement the bug fix in each of the plurality of SaaS portals in the portal group.

19. The non-transitory computer-readable medium as claimed in claim 16, wherein the computer-readable instructions, when executed by the processor, further cause the processor to:

check whether the configuration policy of the SaaS portal is identical to respective configuration policies of each of the plurality of SaaS portals in the portal group, when the runtime error is identified as the performance error;

generate a resolution request, the resolution request being a notification requesting a change in the set of configuration parameters of the SaaS portal to resolve the performance error, when the configuration policy of the SaaS portal is identified to be identical to respective configuration policies of each of the plurality of SaaS portals in the portal group; and generate an investigation ticket, the investigation ticket being a notification requesting inspection of the performance error to identify a cause of the performance error, when at least one of the plurality of SaaS portals in the portal group has a configuration policy different from the configuration policy of the SaaS portal.

20. The non-transitory computer-readable medium as claimed in claim 19, wherein the computer-readable instructions, when executed by the processor, further cause the processor to:

readjust the set of configuration parameters based on the configuration policy of the SaaS portal, when the resolution request is generated;

generate a notification on readjustment of the set of configuration parameters; and readjust respective configuration parameters for each of the plurality of SaaS portals in the portal group, based on the configuration policy.

\* \* \* \* \*